Feb. 11, 1969 A. P. BLOMQUIST 3,426,778
CENTRIFUGAL FORCE OPERATED HYDRAULIC GOVERNOR
Filed May 27, 1966

INVENTOR.
Alfred P. Blomquist
BY
Harness and Harris
ATTORNEYS.

United States Patent Office 3,426,778
Patented Feb. 11, 1969

3,426,778
CENTRIFUGAL FORCE OPERATED HYDRAULIC GOVERNOR
Alfred P. Blomquist, Farmington, Mich., assignor to Chrysler Corporation, Highland Park, Mich., a corporation of Delaware
Filed May 27, 1966, Ser. No. 553,449
U.S. Cl. 137—56　　　　　　　　　　　　　　5 Claims
Int. Cl. G05d *13/10;* G05g *5/06*

ABSTRACT OF THE DISCLOSURE

A governor having a piston valve reciprocably mounted in a cylinder and having spaced lands for controlling the passage of fluid by the valve. The valve is under the influence of centrifugal force and a weight, also under centrifugal force, opposes the outward movement of the valve by means of a double armed lever pivoted about a point intermediate the weight and valve.

Figure 1:
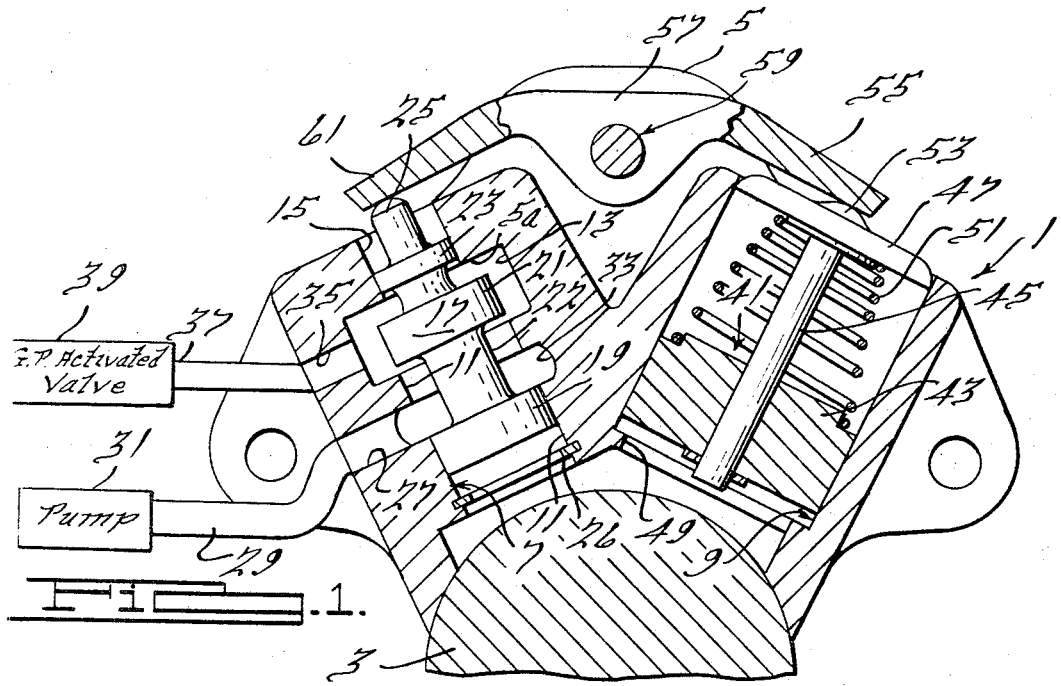

This invention relates to centrifugal force operated hydraulic governors, and more particularly to a hydraulic governor adapted to be mounted on one side of a rotatable member and having a governor pressure-speed curve which is of substantially straight line or linear configuration over a relatively wide speed range.

In particular, this invention is an improvement on the governor discussed in copending U.S. patent application Ser. No. 553,518, filed May 27, 1966, entitled "Governor."

Hydraulic governors presently used in automatic transmissions are of a nonlinear type in which the governor pressure is a function of the square of the revolutions per minute of the transmission output shaft. Such governors have a governor pressure-speed curve shaped in the form of a parabola. Normally, the sensitivity of the governor, i.e., the overall slope of the governor pressure-speed curve, is improved by bottoming out governor weights at one or more mid-speed points to join together two or more parabolic curves, thereby lowering the slope of the multiparabolic curve to provide a more proportional governor pressure-speed relationship. However, the multiparabolic governor pressure-speed curve of each of these governors has wide variations in slope throughout entire speed range, particularly around the points at which two parabolic curves are joined together. These variations in slope, which are synonymous to variations in sensitivity, result in transmission shift points which are not as sharply defined as desired.

Moreover, many hydraulic governors have the weight or weights used for improving the governor pressure-speed curve located on the opposite side of the output shaft from the governor valve. The weights are connected to the valve by a rod or stem extending through a hole formed in the output shaft. This hole produces stress concentrations in the shaft which are not advantageous.

Accordingly, it is a primary object of this invention to provide a hydraulic governor adapted to be mounted at one side of a rotatable member wherein the governor pressure-speed curve of the governor is substantially linear over a relatively wide speed range, thereby providing relatively constant speed sensitivity characteristics.

Another object of this invention is to provide a hydraulic governor of the class described wherein the transmission shift pattern in the mid-speed range is considerably extended.

A further object of this invention is to provide a hydraulic governor such as described, which does not require a hole to be formed in the transmission output shaft, thereby avoiding the presence of stress concentrations in the shaft.

Still another object of this invention is to provide a hydraulic governor which is particularly adapted for use as a speed responsive control of a hydraulically controlled motor vehicle power transmission unit.

Other objects of the invention will become apparent as the description progresses.

Figure 2:
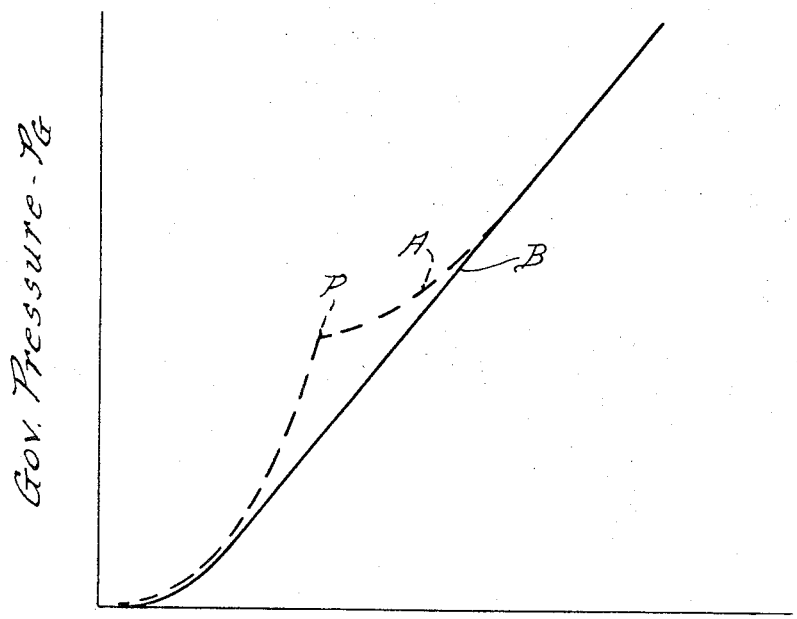

In the accompanying drawings in which one of various embodiments of this invention is shown;

FIGURE 1 is a vertical section view of a hydraulic governor of this invention with certain connecting elements shown schematically; and FIGURE 2 is a graphical illustration of a governor pressure-speed curve for the governor shown in FIGURE 1.

Referring now to the drawings, a hydraulic governor of this invention is generally indicated at 1. It is drivingly connected by means (not shown) to one side of a rotatable member 3, such as the output shaft of an automatic transmission. Governor 1 comprises a body 5 having two adjacent radially extending cylinders or bores 7 and 9. Bore 7 is stepped to provide three portions 11, 13 and 15. Portion 11 is located adjacent shaft 3 and may be referred to as the inner portion. Portion 13 is located outwardly of portion 11 and has a larger diameter than portion 11. The portion 15, which may be referred to as the outer portion, is located outwardly of portion 13 and opens into the area outside body 5.

A control valve member 17 is reciprocably mounted in bore 7 and has annular shoulders or lands 19 and 21 thereon. Shoulders 19 and 21 have substantially the same diameter and are connected by a narrower neck portion 22. A third annular shoulder 23 is provided on valve member 17 and is slidable in outer bore portion 15. A projecting finger 25 extends outwardly from shoulder 23 for a purpose to be described hereafter. A retaining ring 26 is located at the lower end of bore 7 to provide a lower seat for valve 17.

Governor body 5 is formed with a pressure fluid inlet 27 connected by a conduit 29 to a source of pressure fluid, such as a pump 31 driven by the input and/or output shafts of a motor vehicle automatic power transmission. Pump 31 is adapted to supply a system pressure fluid, referred to as "line" pressure fluid, to inlet 27. As shown, inlet 27 opens into portion 11 and an annular recess 33 is formed in the bore 7 for facilitating delivery of pressure fluid to the bore.

A pressure fluid outlet 35 is provided in body 5 and opens into portion 13 of bore 7. Outlet 35 is adapted to receive pressure fluid from inlet 27 when valve 17 is in the position shown in FIGURE 1. The pressure of fluid passing through outlet 35 is herein denoted "governor" pressure and such pressure is transmitted through fluid in a conduit 37 to a pressure fluid operated device 39, such as a transmission shift valve, that is to be responsive to the rotational speed of shaft 3. The outer bore portion 15 provides a vent of relief port for fluid and foreign particles in bore 7 when valve 17 is moved inwardly from the position shown in FIGURE 1 to a position wherein shoulder 17 blocks communication between inlet 27 and outlet 35 and communication is established from bore portion 13 to portion 15. The vent provided by portion 15 is also adapted to permit the "governor" pressure fluid to be vented to insure the lowering of governor pressure to zero when the shaft speed is brought to zero. This will be made more apparent from the subsequent description.

Piston or weight means 41 is slidably mounted in bore 9 and includes a weight or piston 43 slidable on a post 45 which is connected to an end head 47. The inner end of bore 9 is formed with a retaining shoulder 49 for limiting the inward movement of weight 43. Extending between end head 47 and weight 43 is a variable rate or non-linear spring 51 adapted to provide a predetermined variable resistance to the outward movement of weight 43. The load-deflection curve of spring 51 is such that the weight 43 is permitted to move radially outward a different predetermined amount for each different rotational speed of shaft 3.

End head 47 has an outwardly extending hump 53 thereon contacting the outer end of one arm 55 of a double armed lever or rocker 57. Lever 57 is pivotally mounted on housing 5 at 59 in the center thereof at a point midway between the axes of bores 7 and 9. The pivot 59 is made as friction free as possible. The outer end of the other arm 61 of lever 57 is engaged by finger 25. Arms 55 and 61 are the same length so that the forces exerted on the outer ends thereof as a result of the centrifugal forces on weight means 41 and valve member 17 will be opposed to or applied against one another.

The manner in which the aforedescribed device functions as a hydraulic governor is as follows:

When the shaft 3 is at rest or is rotating at very low speeds the valve member 17 is radially inward from the position shown in FIGURE 1 at a position wherein it is seated on or located adjacent to retaining ring 26. In such position, shoulder 21 blocks communication between inlet 27 and outlet 35, while outlet 35 is in communication with the vent portion 15 of bore 7. As the speed of shaft 3 increases, centrifugal force acting on the valve member 17 tends to move it outward to a position wherein the shoulder 21 has cracked open the valve, i.e., to a position wherein shoulder 21 has moved slightly off bore portion 11 to establish communication between inlet 27 and outlet 35. The centrifugal force acting on valve member 17 is proportional to the square of the speed of shaft 3. As shoulder or land 21 moves off bore portion 11 into portion 13 "line" pressure fluid from inlet 27 can pass into "governor" outlet 35. The pressure fluid in bore portion 13 between the outer side of shoulder 21 and the body portion 5a reacts on the shoulder 21 and tends to urge the valve member 17 radially inward to block communication between inlet 27 and outlet 35. If it were not for the hereafter described functions of the weight means 41 and lever 57, the force required to be exerted by the fluid pressure on shoulder 21 to move the valve back to a position wherein communication between inlet 27 and outlet 35 is blocked would have to be equal to the centrifugal force on valve member 17. As mentioned previously, the centrifugal force on valve member 17 is proportional to the square of the speed of shaft 3. The centrifugal force on weight means 41, which includes weight 43, post 45, and head 47 and spring 51, opposes the centrifugal force on valve member 17 through lever 57. The centrifugal force on the weight means is based partially on the distance between the center of gravity of the weight means 41 and the axis of rotation of shaft 3. By the use of the predetermined variable rate spring this distance may be limited to such that the centrifugal force on weight means 41 which opposes the centrifugal force on valve member 17 results in a net outward centrifugal force on valve member 17 which is substantially proportional linearly to the speed of shaft 3, rather than to the square of the speed of the shaft. That is, the variable rate spring is designed to limit the centrifugal force on weight means 41 (by limiting the outward movement of weight 43) at any given speed to be less than the centrifugal force on valve member 17 by an amount substantially equal to a force linearly proportional to the speed of shaft 3. Throughout the speed range from low to high speeds, the total deflection of variable rate spring gets progressively larger, with the additional amount of deflection between equal speed changes getting progressively smaller. The specific spring requirements, which may be conventionally calculated, are dependent upon the selection of valve member 17, weight means 41, and their weights, as well as the location of the centers of gravity of these units. As a result, the pressure of fluid reacting on valve body portion 5a against land or shoulder 21 is linearly proportional to the speed of shaft 3. The pressure of this fluid is the "governor" pressure to which valve 39 is to be responsive.

The amount of spring deflection necessary to obtain the desired centrifugal force on weight means 41 for any particular speed may be readily calculated by first calculating the centrifugal force which will be exerted on valve member 17 for various particular speeds including a high and low speed. The amount of force needed to offset the centrifugal force on the valve member to produce the linear relationship between governor pressure or force and speed is then determined. Having selected and knowing the weights of the materials for the weight means 41, including the approximate weight of spring 51, the position of the center of gravity of the weight means necessary to produce the centrifugal force required for offsetting the centrifugal force on valve member 17 may be determined. The changes in position of this center of gravity for progressively different speeds is dependent upon the amount of spring deflection necessary for operation, and a spring having the required characteristics to produce such deflection may then be selected.

After the shoulder 21 initially establishes communication between inlet 27 and outlet 35 and pressure fluid passes from the inlet to the outlet, the combined forces produced by the fluid pressure on shoulder 21 and the centrifugal force on weight means 41 tend to move, through lever 57, the valve member 17 inwardly to block communication between inlet 27 and outlet 35. However, at the same time that the pressure fluid in bore 7 and the centrifugal force on weight means 41 are tending to move the valve member 17 inwardly, there is a simultaneously applied centrifugal force acting on the valve member 17 which tends to open the valve, i.e., place the inlet 27 in communication with outlet 35. It will thus be seen that radial movement of valve member 17 is the resultant of two unequal centrifugal forces applied against one another by lever 57 with a third force, created by fluid pressure, aiding the smaller of the centrifugal forces in opposing the other centrifugal force. As a result valve member 17 reciprocates radially in bore 7 until an equilibrium is established between the forces acting thereon for each speed of shaft 3. When the valve 17 is in equilibrium the pressure in "governor" outlet 35 is linearly proportional to the speed of shaft 3 and may be used to actuate any type of shaft speed responsive device 39, such as a valve, for example.

If, after the valve member 17 attains equilibrium, the speed of shaft 3 is increased, the valve member is moved outwardly to establish communication between inlet 27 and outlet 35 and "line" pressure fluid is admitted to bore 7. The pressure applied by the fluid against the outer surface of shoulder 21 is determined by the net outwardly directly force on valve member 17, i.e., the force remaining after the centrifugal force on valve member 17 is offset through lever 57 by the centrifugal force on weight means 41. As set forth previously, the variable rate spring 51 permits the weight 43 to move outwardly only a predetermined amount for each speed of shaft 3, thus providing a centrifugal force of such value acting against the centrifugal force on valve member 17 that the outwardly directed force remaining on valve 9 is substantially linearly proportional to the speed of shaft 3. Thus, the fluid or "governor" pressure required to counteract this force is also substantially linearly proportional to the speed of shaft 3, and will urge valve member 17 inwardly until a condition of equilibrium is established for the increased shaft speed.

It will be seen that the radially reciprocating valve member 17 functions as a pressure regulating or pressure reducing valve to convert the system or "line" pressure of the fluid delivered to inlet 27 to a speed responsive "governor" pressure in outlet 35.

The pressure of the fluid in the outlet is proportional to the speed of shaft 3 in a straight line or linear fashion. If the speed of shaft 3 should decrease then the centrifugal force on valve member 17 and weight means 41 is reduced, and valve member 17 moves inwardly to block communication between inlet 27 and outlet 35 and eventually, at low shaft speeds, causing the small shoulder 23 of the valve member to move into bore portion 13. This opening between bore portion 15 and 13 allows the fluid in portion 13 to be vented out through portion 15 and also permits the pressure in portion 13 and outlet 35 to be lowered to atmospheric pressure. It will thus be seen that the pressure of fluid in outlet 35 is directly proportional to the speed of shaft 3 in a linear manner, rather than exponentially. Moreover, since the governor is adapted to be located on one side of a rotatable shaft, the need for providing a diametrically extending bore in the shaft for a stem connecting a valve to a counterweight is avoided, thus eliminating the possibilities of stress concentrations in the shaft. Furthermore, the provision of a vent located at the outer end of the bore of this one-sided governor allows foreign particles to be discharged outwardly from the system.

Governor pressure-speed curves for two different governors are illustrated in FIGURE 2. The vertical axis represents governor pressure $P_G$ and the horizontal axis represents revolutions per minute (r.p.m.) of shaft 3. Curve A is the governor pressure-speed curve of a governor having two resiliently connected weights one of which is adapted to be bottomed out at a predetermined speed.

It will be noted that this curve comprises two parabolic curved portions joined together. It will be noted that the slope on this curve varies considerably depending upon the particular speed at which the curve is observed. The variation in slope is particularly extreme at and around the point at which the two parabolic curved portions are joined together. The slope of the curve just to the left of the point P is very steep thus indicating that for very slight changes in revolutions per minute of a shaft, as such shaft 3, a relatively large governor pressure change will occur. In contrast, the slope on the right hand side of the point P is considerably less, thus indicating that larger changes in revolutions per minute by a shaft produces only minor changes in governor pressure. These variations in slope, which as mentioned previously, are synonymous with variations in sensitivity, result in transmission shift points, particularly in the mid-speed range around point P, which are not as sharply defined as desired.

Line B represents the governor pressure-speed curve of a governor of this invention. It will be seen that line B is substantially linear and that the slope thereof does not fluctuate significantly. Thus, the shift points for a transmission to which this governor is attached are clearly defined and the sensitivity of the device remains substantially constant and uniform throughout the complete speed range, thus resulting in better control of the transmission shift points. The parabolic portion of curve B at the lower end thereof, merely indicates that a preload has been placed on the nonlinear spring 51. Until the weight 43 overcomes this preload on spring 51, the governor pressure-speed curve of the governor is parabolic. The actual slope of the governor pressure-speed curve B may be controlled by changing the reaction area between the shoulder 21 and the portion 5a of body 5, if the variables, such as the weights of the valve member 17, weight means 41, and the variable rate of spring 51 are known.

It will thus be seen that a one-sided governor of this invention is adapted to provide a governor pressure-speed curve which is substantially linear over relatively wide speed range, thereby providing relatively uniform transmission shift point characteristics. Furthermore, the shaft 3 is relieved of any stress concentrations due to absence of a hole therethrough. In addition, a vent is provided at the outer end of the valve bore for venting fluid and foreign particles from the governor.

The particulars of the foregoing description are provided merely for purposes of illustration and are subject to considerable latitude of modification without departing from the novel teachings disclosed herein. Accordingly, the scope of the invention is intended to be limited only as defined in the appended claims and equivalent thereof.

I claim:

1. A governor adapted to be mounted on a rotatable member and connected to a source of pressure fluid comprising first cylinder means having a pressure fluid inlet and a pressure fluid outlet, a valve reciprocably mounted in said cylinder means and arranged to control the passage of pressure fluid from said inlet to said outlet, said valve being moved radially by centrifugal force, second cylinder means having weight means therein, said weight means being moved radially by centrifugal force, lever means for applying the centrifugal force on said weight means against the centrifugal force on said valve, said weight means having means for restraining its outward movement to reduce the centrifugal force on it below the centrifugal force on said valve by an amount sufficient to produce a net outward centrifugal force on said valve which is approximately linearly proportional to the rotational speed of said rotatable member, said weight means further including a weight having a hole therethrough, an end head in contact with said lever means, a post on said end head extending through the hole in said weight for slidingly mounting the latter, said means for restraining outward movement of said weight means comprising a spring surrounding said post and extending between said end head and said weight.

2. A governor adapted to be mounted on a rotatable member and connected to a source of pressure fluid comprising a valve body having a first radially extending bore therein, said body having a pressure fluid inlet into said bore and a pressure fluid outlet from said bore, a valve reciprocably mounted in said first bore, said valve having a shape adapted to provide an unbalanced area on which pressure fluid admitted to said cylinder acts to produce inwardly directed forces on said valve, said valve being adapted to be moved outwardly by centrifugal force, a second radially extending bore adjacent said first bore, weight means comprising a spring having a non-linear movement by centrifugal force, and a lever pivoted on said body having opposing arms in contact with said weight means and valve for applying the centrifugal force on said weight means against the centrifugal force on said valve, said weight means including a weight slidably mounted in said second bore, an end head slidably mounted in said second bore, a post on said end head extending radially inwardly, said weight being mounted on said post, said means for restraining outward movement of said weight means comprising a spring having a non-linear load-deflection curve biasing said weight away from said end head.

3. A governor as set forth in claim 2 wherein said first cylinder includes vent means at the outer end thereof for evacuating fluid and foreign particles from the governor.

4. A governor adapted to be mounted on a rotatable member and connected to a source of pressure fluid comprising a body having first and second adjacently located and radially extending bores, said body having a pressure fluid inlet into said first bore and a pressure fluid outlet from said first bore, a valve member in said first bore for controlling the passage of pressure fluid from said inlet to said outlet, said valve member being moved outwardly by centrifugal force, weight means in said second bore movable outwardly by centrifugal force, and a rocker member pivotally mounted on said body between said bores and in contact with said valve member and weight means, said rocker being adapted to apply the force exerted thereon by said weight means against said valve member for opposing the centrifugal force on said valve member, said weight means including a spring having a nonlinear load-deflection curve for restraining outward movement of said weight means to reduce the effective centrifugal force on it below the centrifugal force on said valve member to produce a net outward centrifugal force on said valve member approximately linearly proportional to the rotational speed of said rotatable member, said first bore including vent means at the outer end thereof for evacuating fluid and foreign particles from the governor.

5. A governor adapted to be mounted on a rotatable member and connected to a source of pressure fluid comprising first cylinder means having a pressure fluid inlet and a pressure fluid outlet, a valve reciprocably mounted in said cylinder means and arranged to control the passage of pressure fluid from said inlet to said outlet, said valve being moved radially by centrifugal force, second cylinder means having weight means therein, said weight means being moved radially by centrifugal force, lever means for applying the centrifugal force on said weight means against the centrifugal force on said valve, said weight means having means for restraining its outward movement to reduce the centrifugal force on it below the centrifugal force on said valve by an amount sufficient to produce a net outward centrifugal force on said valve which is approximately linearly proportional to the rotational speed of said rotatable member, said weight means including a weight slidably mounted in said second cylinder, an end head slidably mounted in said second cylinder, a post on said end head extending radially inwardly, said weight being mounted on said post, said means for restraining outward movement of said weight means comprising a spring having non-linear deflection load curve biasing said weight away from said end head.

References Cited
UNITED STATES PATENTS 3,139,079  6/1964  Bettoni _____ 137—56 X

FOREIGN PATENTS 913,753  12/1962  Great Britain.

CLARENCE R. GORDON, *Primary Examiner.*

U.S. Cl. X.R.

73—540